United States Patent [19]
Kurita et al.

[11] Patent Number: 6,103,415
[45] Date of Patent: Aug. 15, 2000

[54] FUEL CELL WITH RECTIFYING PLATES FOR UNIFORM GAS FLOW

[75] Inventors: Kenji Kurita, Nagaya; Katsuhiro Kajio, Anjo, both of Japan

[73] Assignee: Aisin Seki Kabushiki Kaisha, Kariya, Japan

[21] Appl. No.: 09/107,453

[22] Filed: Jun. 30, 1998

[30] Foreign Application Priority Data

Jun. 30, 1997 [JP] Japan .................................. 9-174007

[51] Int. Cl.$^7$ ................................................ H01M 2/00
[52] U.S. Cl. ................................................................ 429/34
[58] Field of Search ............................ 429/34, 38, 39

[56] References Cited

U.S. PATENT DOCUMENTS

| | | | |
|---|---|---|---|
| 4,696,870 | 9/1987 | Sasaki et al. ............................ | 429/14 |
| 5,108,849 | 4/1992 | Watkins et al. ......................... | 429/30 |
| 5,401,589 | 3/1995 | Palmer et al. .......................... | 429/13 |
| 5,741,605 | 4/1998 | Gillett et al. ........................... | 429/31 |
| 5,776,625 | 7/1998 | Kaufman et al. ....................... | 429/30 |
| 5,798,188 | 8/1998 | Mukohyama et al. .................. | 429/34 |
| 5,824,428 | 10/1998 | Nishida et al. ......................... | 429/26 |
| 5,922,485 | 7/1999 | Enami ..................................... | 429/26 |

FOREIGN PATENT DOCUMENTS

| | | |
|---|---|---|
| 8-124592 | 5/1996 | Japan . |
| 8-213044 | 8/1996 | Japan . |
| 8-293318 | 11/1996 | Japan . |

*Primary Examiner*—Kathryn Gorgos
*Assistant Examiner*—Erica Smith-Hicks
*Attorney, Agent, or Firm*—Burns, Doane, Swecker & Mathis, LLP

[57] ABSTRACT

A fuel cell includes a plurality of laminated gas chambers, a plurality of separators that separate the gas chambers, intake passages for supplying fuel gas and oxidizing gas, exhaust passages for emitting the fuel gas and the oxidizing gas, intake ports to supply fuel gas and oxidizing gas from the intake passages to the gas chambers, exit ports to exit the fuel gas and the oxidizing gas from the gas chambers to the exhaust passages, and rectifying plates located at one end of the intake ports and extending across at least one of the gas intake passages. Each of the rectifying plates effectively restricts direct gas flow from one of the intake passages to the intake ports. Therefore, the number of gas chambers can be increased as compared to conventional fuel cells. Even though the number of gas chambers is increased, each gas chamber uniformly receives gas due to the excellent gas distribution achieved by the rectifying plates.

6 Claims, 4 Drawing Sheets

FUEL CELL WITH RECTIFYING PLATES FOR UNIFORM GAS FLOW

This application is based on and claims priority under 35 U.S.C. § 119 with respect to Japanese Application No. 09(1997)-174007 filed on Jun. 30, 1997, the entire content of which is incorporated herein by reference.

FIELD OF THE INVENTION

The present invention generally pertains to a fuel cell. More particularly, the present invention pertains to a fuel cell provided with laminated separators to separate each gas chamber to which gas is supplied with activating regent.

BACKGROUND OF THE INVENTION

A conventional fuel cell is provided with laminated separators to separate the gas chambers. Each gas chamber receives gas with activated regent to generate electric energy. Typically, a conventional fuel cell includes a plurality of gas chambers that are disposed in parallel in the laminating direction of the separators. It is thus necessary in conventional fuel cells to distribute gas uniformly to each gas chamber to efficiently generate electric power.

Japanese Laid-Open Patent Publication No. H08-124592 published on May 17, 1996 discloses a fuel cell that is designed to achieve improved gas distribution. As shown in FIG. 8, a separator 100 includes a gas flow passage 101 and a bridge 102. As illustrated in FIG. 9, the bridge 102 divides the gas flow passage 101 in an attempt to improve uniform gas distribution to the gas chambers.

Further, Japanese Laid-Open Publication No. H08-213044 published on Aug. 20, 1998 discloses providing a porous body in a gas flow passage nearby an end plate.

However, the aforementioned fuel cells still suffer from insufficient gas distribution because the gas density can vary in each of the gas chambers laminated in the laminating direction of the separators. As the number of laminations increases, variations in the gas distribution can become even more significant. Thus, in these conventional fuel cells, potential problems still exist with respect to the ability of each of the unit cells to uniformly generate electric power.

In light of the foregoing, a need exists for a fuel cell which is not susceptible to the same problems mentioned above.

It would be desirable in light of the aforementioned limitations associated with known fuel cells to provide a fuel cell which is able to distribute gas uniformly to each of the gas chambers.

It would also be desirable to provide a fuel cell having an increased number of laminated gas chambers that receive gas supply uniformly.

SUMMARY OF THE INVENTION

In light of the foregoing, the present invention provides a fuel cell that includes a plurality of laminated gas chambers, a plurality of separators that separate the gas chambers, intake passages for supplying fuel gas and oxidizing gas, exhaust passages for emitting the fuel gas and the oxidizing gas, intake ports to supply fuel gas and oxidizing gas from the intake passages to the gas chambers, and exit ports to exit the fuel gas and the oxidizing gas from the gas chambers to the exhaust passages. Rectifying plates are located at one end of the intake ports and extend across at least one of the gas intake passages.

According to the present invention, each of the rectifying plates effectively restricts direct gas flow from one of the intake passages to the intake ports. Therefore, the number of gas chambers can be increased as compared to a conventional fuel cell. Also, even though the number of gas chambers is increased, each gas chamber is able to uniformly receive gas due to the excellent gas distribution achieved by the rectifying plates.

According to another aspect of the present invention, a fuel cell includes a plurality of gas chambers including a first gas chamber and a second gas chamber, a plurality of separators which separate each of the gas chambers from one another, an oxidizing gas intake passage for supplying oxidizing gas to the first gas chamber, and a fuel gas intake passage for supplying fuel gas to the second gas chamber. An oxidizing gas exhaust passage emits exhausted oxidizing gas from the first gas chamber and a fuel gas exhaust passage emits exhausted fuel gas from the second gas chamber. The fuel cell is also provided with a rectifying plate positioned between either the oxidizing gas intake passage and the first gas chamber or the fuel gas intake passage and the second gas chamber to restrict direct gas flow towards either the first gas chamber or the second gas chamber.

Another aspect of the present invention involves a fuel cell having a plurality of laminated gas chambers including a first gas chamber and a second gas chamber, a plurality of separators which separate the gas chambers from one another, and an oxidizing gas intake passage for supplying oxidizing gas to the first gas chamber. The oxidizing gas intake passage contains a main path, an intake port, an intake path connecting the main path to the intake port, and a rectifying plate extending across the intake path to restrict direct oxidizing gas flow to the intake passage. A fuel gas intake passage supplies fuel gas to the second gas chamber, an oxidizing gas exhaust passage containing exit ports exits exhausted oxidizing gas from the first gas chamber, and a fuel gas exhaust passage to emit exhausted fuel gas from the second gas chambers.

BRIEF DESCRIPTION OF THE DRAWING FIGURES

DETAILED DESCRIPTION OF PREFERRED EMBODIMENTS

Figure 4:
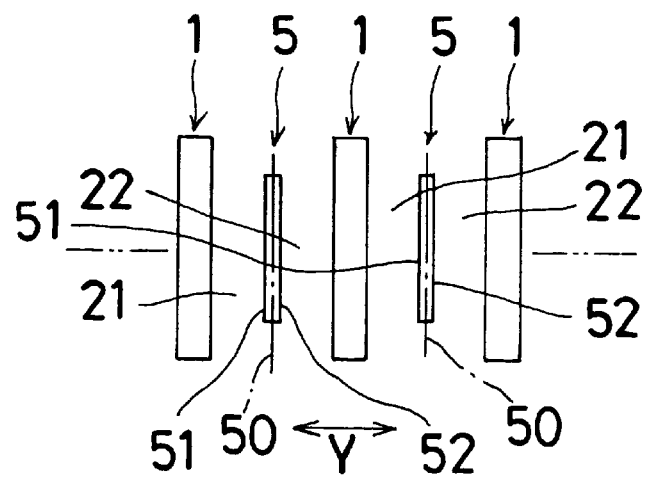
FIG. 4 is a side view of a portion of the fuel cell according to the first embodiment of the present invention.

With reference initially to FIG. 4 which illustrates a portion of a fuel cell according to a first embodiment of the present invention, the fuel cell includes a plurality of separators 1 that are laminated in their thickness direction Y (hereinafter referred to as the laminating direction Y). A unit cell 5 is disposed between each pair of adjacent laminated separators 1. Each unit cell 5 includes a fixed electrolytic film 50, a cathode 51 and an anode 52. The fixed electrolytic film 50 is pinched or sandwiched between the cathode 51 and the anode 52.

The separators 1 divide the space around each unit cell 5 into a first gas chamber (oxidizing gas chamber) 21 and a second gas chamber (fuel gas chamber) 22. The first gas chamber 21 faces the cathode 51 and receives oxidizing gas as a cathode activating regent. The second gas chamber 22 faces the anode 52 and receives fuel gas as an anode activating regent. The oxidizing gas may be air including oxygen and other substances. The fuel gas can be hydrogen gas including hydrogen and other substances.

Figure 2:
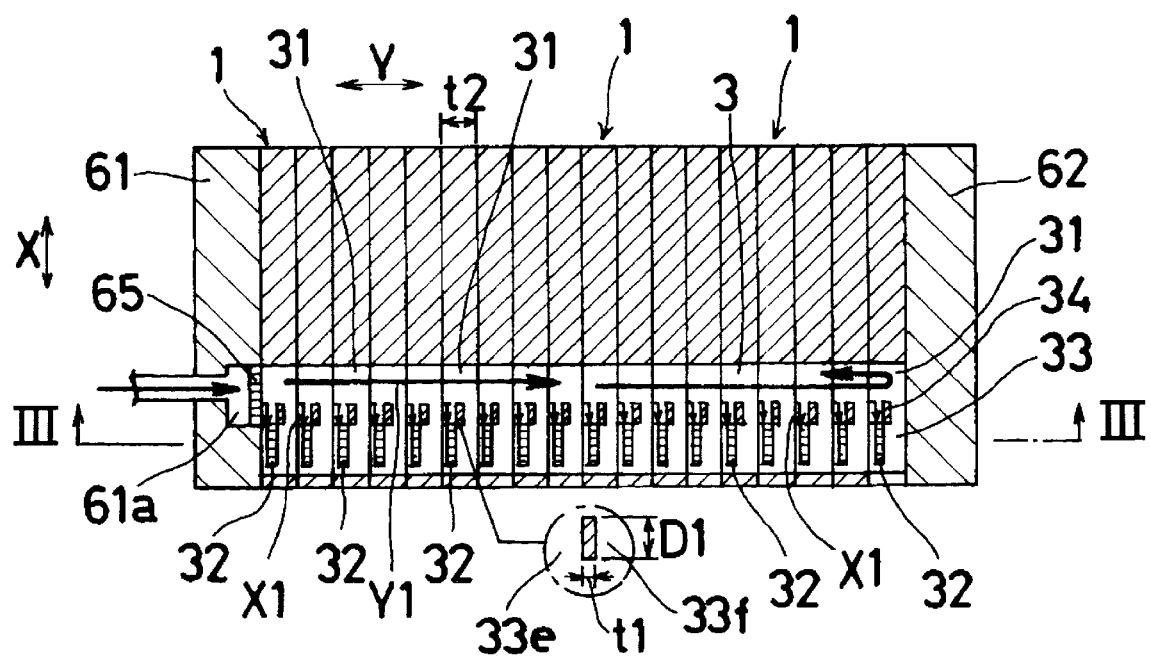
FIG. 2 is a cross-sectional view of the fuel cell provided with laminated separators according to the first embodiment of the present invention.
Figure 3:
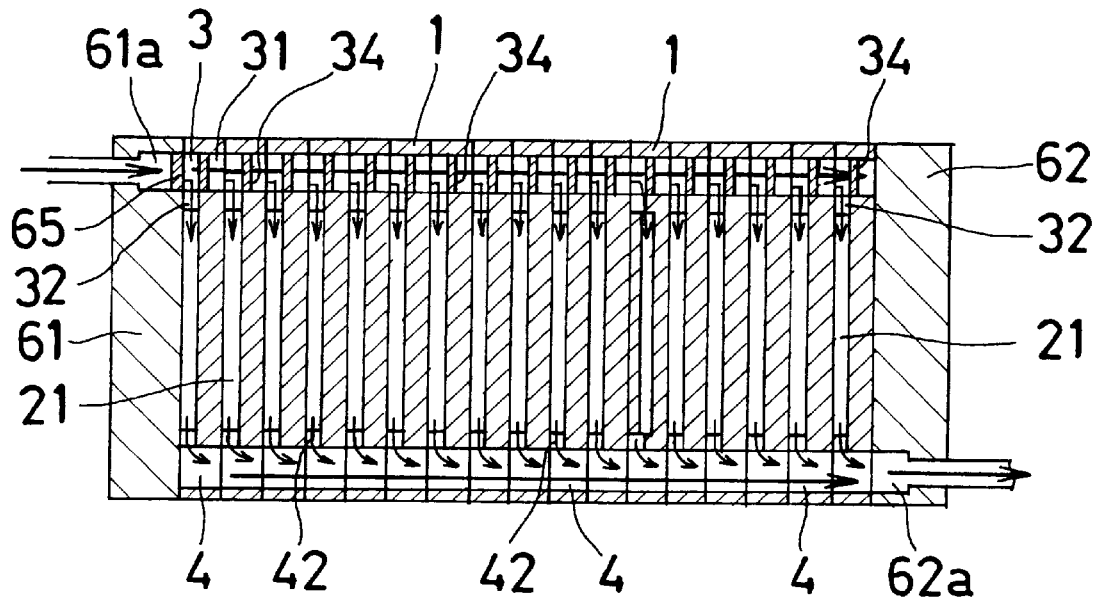
FIG. 3 is a cross-sectional view of the fuel cell shown in FIG. 2 taken along the section line III—III in FIG. 2.

Reference is now made to FIGS. 2 and 3 in which the unit cell is not illustrated for purposes of simplifying the illustration. As shown in FIG. 2, a first end plate 61 is disposed at one end of the laminated separators 1 and a second end plate 62 is disposed at the opposite end of the laminated separators 1. The separators 1 are pinched or sandwiched between the first and second end plates 61, 62.

As shown in FIG. 3, an air supplying port (oxidizing gas supplying port) 61a is formed in the end plate 61 and a resistant member 65 is provided in the air supplying port 61a. The resistant member 65 is made of a porous body, such as metal foam. An exhaust port (oxidizing gas exhaust port) 62a is formed in the second end plate 62 to emit exhaust air.

The resistant member 65 can be made from a material that is resistant to rust in the presence of moist air and can be designed to have a proper pressure loss y (kPa). This pressure loss y is expressed by the following formula:

$$y=(2 \text{ to } 6)\cdot 10^{-3}\cdot x$$

wherein x is the flow rate (Nl/min)

Figure 1:
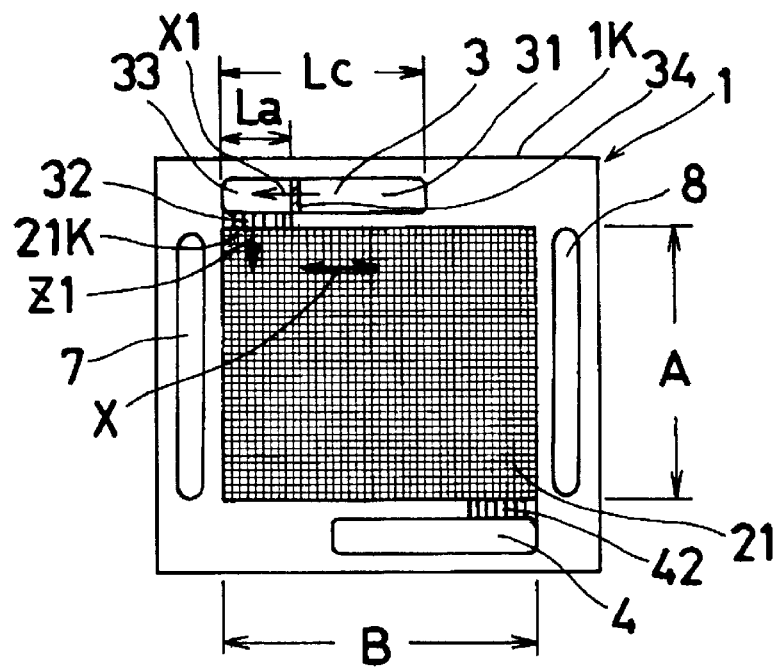
FIG. 1 is a plan view of the separator according to a first embodiment of the present invention for use in a fuel cell in accordance with the present invention.

As shown in FIG. 1, many grooves are formed around the center of the separator 1 to form the first gas chamber 21. The first gas chamber 21 is rectangular with sides A and B. The second gas chamber 22 is formed on the opposite side of the separator 1.

At the peripheral portion 1k of the separator 1, an oxidizing gas intake passage 3 is formed to supply air to the first gas chamber 21. Further, an air exhaust passage (oxidizing gas exhaust passage) 4 is also formed at the generally diagonally oppositely located peripheral portion 1k of the separator 1 to emit exhausted air from the first gas chamber 21 through an exit port 42.

As shown in FIG. 1, the oxidizing gas intake passage 3 contains a side intake hole 31 forming part of a main path, a gas intake port 32 and a rectifying plate 34. Each intake port 32 is located at a corner 21k of each first gas chamber 21. The rectifying plate 34 is provided across another side intake hole 33 forming part of an intake passage that extends in the X direction and connects the main path formed by the side intake holes 31 to the intake port 32 on the same plane as the separator 1. The direction X is perpendicular to the laminating direction Y of the separators 1. Further, as shown in FIG. 2, the rectifying plate 34 projects from the end of the intake port 32 to the main path.

As shown in FIG. 2, the main path formed by the side intake holes 31 extends from the air supplying port 61a so that air flows in the laminating direction Y of the separator 1. The rectifying plate 34 is able to limit direct air flow from the main path to the intake path 32.

As shown in FIG. 1, the intake port 32 has a width La and this width La is smaller than the width Lc of the air intake passage 3. The exit port 42 has the same dimensional relationship to the air exhaust port as in the case of the intake port 32. A ratio between the widths La and Lc may be as follows:

La:Lc=1:(2 to 5); preferably La:Lc=1:(3 to 4)

Accordingly, the opening area of the intake port 32 is relatively small.

As further seen in FIG. 1, a hydrogen intake hole (fuel gas intake hole) 7 and a hydrogen exit hole (fuel gas exit hole) 8 are formed at the peripheral portion 1k of the separator 1 on opposites sides of the separator 1. Hydrogen gas is supplied from the hydrogen intake hole 7 to the second gas chamber 22 and exhaust gas exits from the second gas chamber 22 to the hydrogen exit hole 8. The hydrogen gas intake hole 7 can be provided with an intake port to supply the fuel gas from the intake hole to the second gas chamber 22 and the hydrogen exit hole 8 can be provided with an exit port to exit the exhausted fuel gas from the second gas chamber 22 to the hydrogen exit hole.

As shown in FIG. 2, the thickness t1 of the rectifying plate 34 is smaller than the thickness t2 of the separator 1 (t1<t2). Accordingly, spaces 33e, 33f are formed on both sides of the rectifying plate 34. Further, the width D1 of the rectifying plate 34 is larger than the thickness t1 of the rectifying plate 34 (t1<D1).

In this embodiment, the separator 1 includes a pressed stainless steel plate and a rubber coating that covers the entire surface of the stainless steel plate. Accordingly, the rectifying plate 34 may be a flat portion of the pressed stainless steel integrated with the separator 1.

When air is supplied from the air supplying port 61a, the supplied air passes through the resistant member 65 and flows into the main path formed by the side intake holes 31 in the direction Y1. Then, the air flows into the intake path 33 over the rectifying plate 34 along the direction X1. The air further flows from the intake path 33 to the first gas chamber 21 thorough the intake port 32 along the direction Z1.

The air is exited from the first gas chamber 21 to the air exhaust passage 4 through the exit port 42. The air is emitted from the exhaust port 62a as shown in FIG. 3.

On the other hand, the hydrogen gas flows from the hydrogen intake hole 7 to the hydrogen exit hole 8 through the second gas chamber 22.

As a result, the air including oxygen is supplied to the first gas chamber 21 that faces to the cathode 51. At the same time, the hydrogen gas is supplied to the second gas chamber 22 that faces to the anode 52. At the anode 52, hydrogen ions (protons) and electrons are generated by the following chemical reaction:

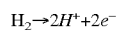

$$H_2 \rightarrow 2H^+ + 2e^-$$

The hydrogen ions move to the cathode 51 passing through the fixed electrolytic film 50 and the electrons move to the cathode 51 flowing through an external electric circuit. This is how electricity is generated in the fuel cell of the present invention.

In this embodiment of the present invention, it is advantageously possible to use a larger number of laminated separators 1 than in the case of a conventional fuel cell. Even though the number of first gas chamber 21 is increased, each first gas chamber 21 is able to uniformly receive air due to the excellent air distribution achieved by the rectifying plates 34. Therefore, each unit cell 5 is able to generate electricity uniformly. This is because each of the rectifying plates 34 effectively restricts direct air flow from the main path to the intake port 32. This advantageous result has been confirmed through computer simulations and experiments.

Figure 5:
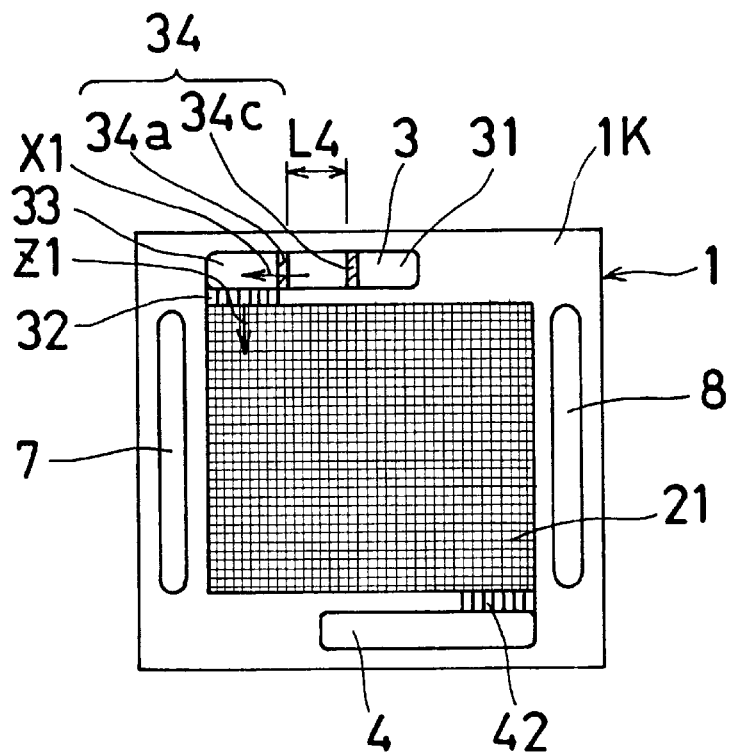
FIG. 5 is a plan view of the separator according to a second embodiment of the present invention for use in a fuel cell in accordance with the present invention.
Figure 6:
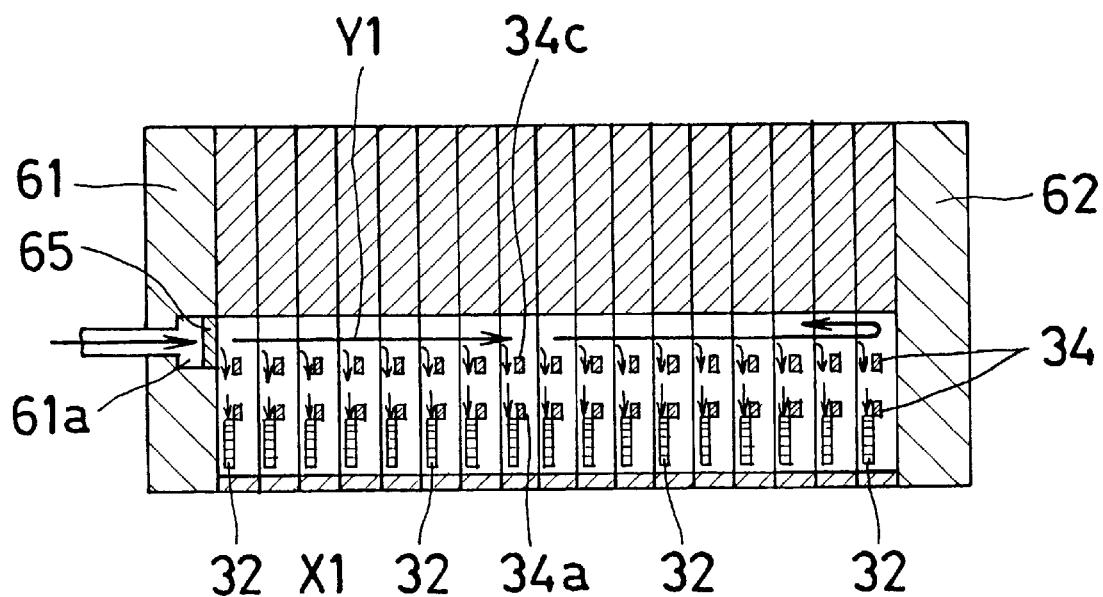
FIG. 6 is a cross-sectional view of the fuel cell provided with laminated separators according to the second embodiment of the present invention.

FIGS. 5 and 6 illustrate a second embodiment of the present invention. Elements in the second embodiment that are the same as those in the first embodiment are designated by the same reference numerals. The second embodiment has the same general operation and advantages as the first embodiment. In the second embodiment, two rectifying plates 34a, 34c are provided in parallel across the air intake passage 3 on the same plane as the separator 1.

Figure 7:
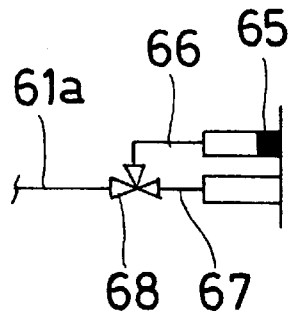
FIG. 7 is a diagram showing a portion of the fuel cell according to another embodiment of the present invention.
Figure 8:
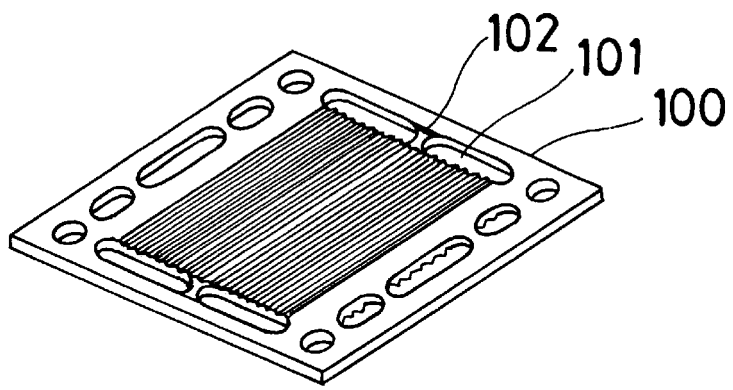
FIG. 8 is a perspective view of a conventional separator.
Figure 9:
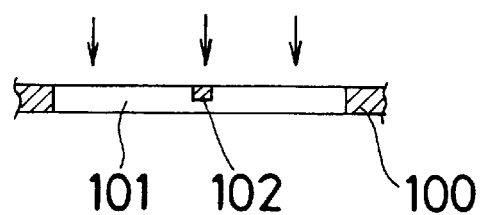
FIG. 9 is a cross-sectional view of the bridge used in a conventional separator.

FIG. 7 shows a third embodiment of the present invention. This third embodiment has the same general operation and advantages as in the first and second embodiments. In the third embodiment, a switching valve 68 is connected to the air supply port 61a and the switching valve 68 is able to select either one of two air paths, namely a first air path 66 or a second air path 67. As illustrated in FIG. 7, the resistant member 65 is only provided in the first path 66. The switching valve 68 can select the second path 67 so to bypass the resistant member 65 when the air flow rate is less than a predetermined value, for example, 250 (N1/min). On the other hand, the switching valve 68 is able to select the first path 66 in order to ensure that the air is passed through the resistant member 65 when the air flow rate is greater than or equal to the predetermined value. The switching valve 68 may be controlled electronically or manually.

It is also to be noted that the switching valve 68 can be adapted for use in both the first and the second embodiments as well.

In the first embodiment described above, a rectifying plate 34 is not formed in the exhaust air passage 4. However, it is to be understood that such a rectifying plate 34 could be formed in the exhaust air passage 4 to easily manufacture the separator 1.

In the embodiments described above, the rectifying plates 34 are provided in the air intake passage 3 to improve the uniform distribution of the air including oxygen. The rectifying plates may also be advantageously used in a similar manner in the hydrogen intake hole 7 to improve the uniform distribution of the hydrogen gas.

The principles, preferred embodiments and the mode of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A fuel cell comprising:
a plurality of laminated separators arranged in a laminated direction;
a plurality of oxidizing gas chambers and a plurality of fuel gas chambers separated from one another by the separators;
a pair of end plates each positioned at one side of the plurality of laminated separators with respect to the laminated direction;
an oxidizing gas supplying port positioned in one of the end plates;
an oxidizing gas exhaust port positioned in one of the end plates;
a plurality of oxidizing gas intake holes provided in each separator, said plurality of oxidizing gas intake holes in each separator including one side intake hole connected to said oxidizing gas supplying port and forming together with the one side intake hole in other separators an oxidizing gas main path extending in the laminated direction of the separators along which is supplied oxidizing gas from the oxidizing gas supplying port, said plurality of oxidizing gas intake holes in each separator also including another side intake hole connected to a gas intake port that is in communication with one of said oxidizing gas chambers;
a fuel gas intake hole provided in each separator to supply fuel gas along the laminated direction of the separators to one of the fuel gas chambers;
an oxidizing gas exit hole provided in each separator and communicating with one of the oxidizing gas chambers and with the oxidizing gas exhaust port;
a fuel gas exit hole provided in each separator and communicating with one of the fuel gas chambers through which fuel gas exits;
at least one rectifying plate extending across at least either the fuel gas intake hole or one of the oxidizing gas intake holes in each separator to facilitate uniform distribution of gas.

2. The fuel cell according to claim 1, wherein said rectifying plate is located at an end of said one side intake hole.

3. The fuel cell according to claim 1, including a resistant member for reducing a gas flow rate in one of the fuel gas supplying port or the oxidizing gas supplying port, and a switching valve to selectively bypass the resistant member when a gas flow rate is less than a predetermined value.

4. The fuel cell according to claim 1, wherein the rectifying plates have a thickness that is less than the thickness of the separators.

5. The fuel cell according to claim 1, wherein the rectifying plates each have a width that is greater than the thickness of the rectifying plates.

6. The fuel cell according to claim 1, wherein the oxidizing gas supplying port is positioned in one of the end plates and the oxidizing gas exhaust port is positioned in the other end plate.

* * * * *

UNITED STATES PATENT AND TRADEMARK OFFICE
CERTIFICATE OF CORRECTION

PATENT NO.    : 6,103,415
DATED         : August 15, 2000
INVENTOR(S)   : Kenji KURITA, et al.

It is hereby certified that error appears in the above-identified patent and that said Letters Patent is hereby corrected as shown below:

In Section [73], name of Assignee is corrected to read --Aisin Seiki Kabushiki Kaisha--.

Signed and Sealed this

Fifteenth Day of May, 2001

Attest:

NICHOLAS P. GODICI

Attesting Officer    Acting Director of the United States Patent and Trademark Office

UNITED STATES PATENT AND TRADEMARK OFFICE
CERTIFICATE OF CORRECTION

PATENT NO. : 6,103,415
DATED : August 15, 2000
INVENTOR(S) : Kenji Kurita et al.

It is certified that error appears in the above-identified patent and that said Letters Patent is hereby corrected as shown below:

<u>Title page,</u>
Item [73], Assignee, should read -- Aisin Seiki Kabushiki Kaisha --.

Signed and Sealed this

Twenty-first Day of September, 2004

JON W. DUDAS
*Director of the United States Patent and Trademark Office*